United States Patent [19]

Moghe

[11] 4,150,932

[45] Apr. 24, 1979

[54] EXTRUDER STRAINER PLATE

[75] Inventor: Sharad R. Moghe, Northfield Center, Ohio

[73] Assignee: The B. F. Goodrich Company, Akron, Ohio

[21] Appl. No.: 788,220

[22] Filed: Apr. 18, 1977

[51] Int. Cl.² .................................................. B29F 3/06
[52] U.S. Cl. .......................... 425/197; 210/DIG. 15; 366/87; 425/380; 425/467
[58] Field of Search .............. 425/197, 198, 199, 382, 425/382.2, 464, 463, 380, 467, 381; 366/87; 210/498, DIG. 15; 166/227

[56] References Cited
U.S. PATENT DOCUMENTS

| 1,652,650 | 12/1927 | Watson et al. ................... 425/197 X |
| 2,971,219 | 2/1961 | Hill ............................ 425/198 UX |
| 3,387,327 | 6/1968 | Prvott, Jr. et al. ............. 425/464 X |
| 3,609,806 | 10/1971 | Schippers et al. .................. 425/197 |

*Primary Examiner*—Roy Lake
*Assistant Examiner*—Mark Rosenbaum
*Attorney, Agent, or Firm*—Joseph Januszkiewicz

[57] ABSTRACT

Aramid fiber reinforced hose having the fiber in discrete particles extruded with the elastomer to provide orientation of the aramid fibers in two oppositely helical overlapping directions. A strainer plate is located within the extruder that has a series of apertures on concentric circles with each series of apertures extending through the plate at opposite helical directions.

7 Claims, 11 Drawing Figures

U.S. Patent    Apr. 24, 1979    Sheet 1 of 3    4,150,932
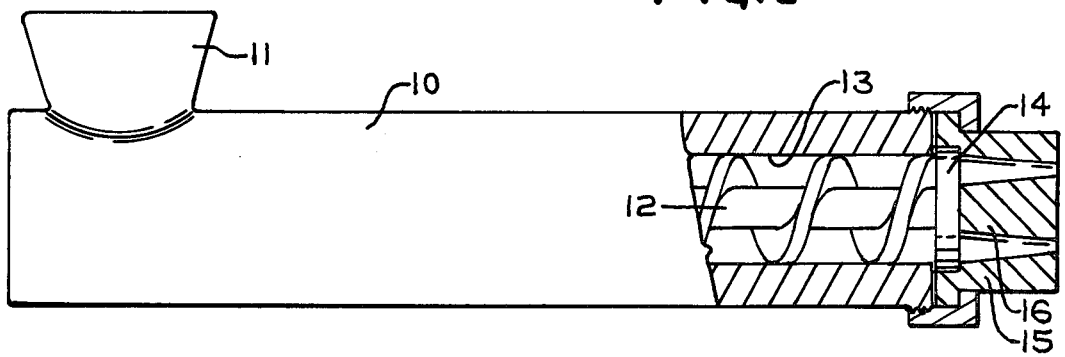
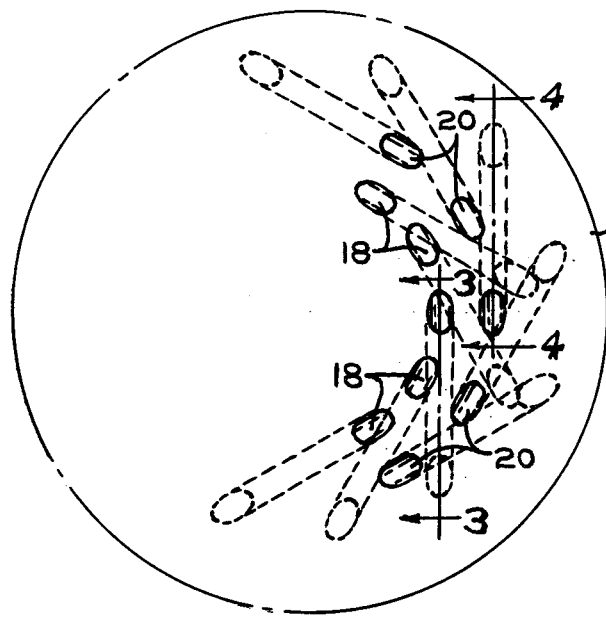
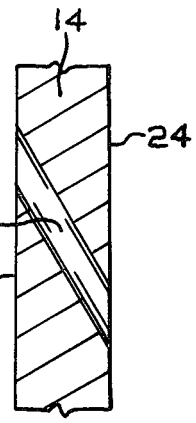
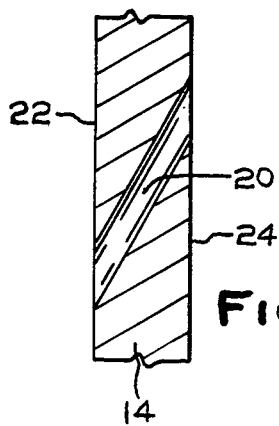
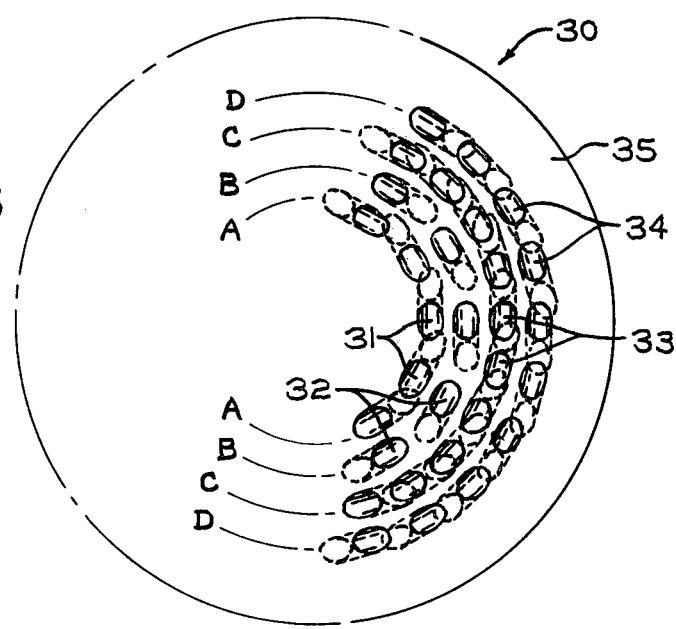

EXTRUDER STRAINER PLATE

BACKGROUND OF THE INVENTION

This invention relates to the manufacture of fiber reinforced hose and more particularly to an extruded aramid fiber reinforced hose having criss-crossing helically orientated fibers or hose with aramid fibers reinforcement.

To improve the quality of hose, it has become desirable to incorporate filamentary reinforcing materials to the hose body. One of the principle ways in which this is achieved is to wind a surface layer or layers of nonwoven filamentary material impregnated with a polymeric material around a rod or mandrel and bonding the surface layers together. As illustrated in U.S. Pat. No. 3,957,085, the strips of nonwoven material are formed from a layer of randomly disposed nylon filaments which have been subjected to the heat and pressure to fuse the filaments together and form a unitary sheet. A surface film of polymeric material such as latex rubber is applied to the matrix material. The layers of impregnated materials are then wound helically. Different layers may then be wound helically to form the hose pipe. Other prior art teachings suggest using an extruder but to introduce the material at locations other than the hopper to prevent chopping of the fibers by the rotation of the extruder screw. (See U.S. Pat. No. 3,429,003). The present invention contemplates the use of an extruder wherein the finely chopped discrete aramid filaments are mixed with the elastomer at the hopper and the mixture is worked along the full length of the barrel and extruded through the strainer plate and die head to form an aramid filament reinforced hose, wherein the filaments are inclined in opposite directions helically about the hose body to provide a hose which has unusual properties. The apparatus of this invention eliminates the numerous steps and auxiliary machinery heretofore necessary to provide the helically winding of the fiber reinforced materials.

SUMMARY OF THE INVENTION

The present invention contemplates an apparatus utilizing a conventional extruder wherein the elastomer is fed into a hopper with finely chopped aramid filaments of discrete particles sized for disperison through the mixture. As the mixture is extruded through the die head into an annular hose shape, the discrete particles are orientated into two separate overlapping helical directions which are inclined to the longitudinal axis of the annular hose shape. The strainer plate has a series of apertures or holes drilled on concentric circles. All the holes or apertures on one circle are drilled on an inclined angle to the longitudinal axis of the circle, while the next concentric circle has the holes drilled on an inclined angle in a direction opposite to the first circle. The resulting flow of extrudate will orientate the fibers in two separate helical directions that are symmetrical to the central axis. Other modifications of this invention are comtemplated.

BRIEF DESCRIPTION OF THE DRAWINGS

FIG. 1 is a schematic side elevational view partly in section of the novel apparatus showing a portion of the extruder screw and the strainer plate.

FIG. 2 is a front elevational view of the strainer plate showing a portion of the apertures with the extension through the strainer plate shown in dotted lines.

FIG. 3 is a cross-sectional fragmentary view of a portion of the strainer plate taken on line 3—3 of FIG. 2 showing an aperture extending through the strainer plate.

FIG. 4 is a cross-sectional fragmentary view of a portion of the strainer plate taken on line 4—4 of FIG. 2 showing another aperture on a different concentric circle than that shown in FIG. 3 with an aperture extending through the strainer plate.

FIG. 5 is a front elevational view of a modified form of strainer plate showing a portion of the apertures with the extension through the strainer plate shown in dotted lines.

DETAILED DESCRIPTION

Figure 6:
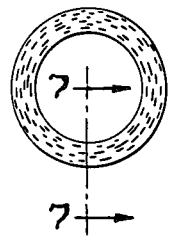
FIG. 6 is a cross-sectional view of a hose.
Figure 7:
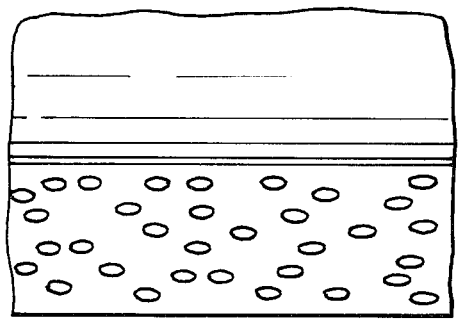
FIG. 7 is a fragmentary enlarged cross-sectional view of a portion of a hose taken on line 7—7 of FIG. 6.

Referring to the drawings wherein like characters designate like or corresponding parts throughout the several views, there is shown in FIG. 1 an extruder 10 having a hopper 11 and an extruder screw 12 suitably journaled in bore 13 and suitably powered. A strainer plate 14 is suitably fastened between the end of the extruder 10 adjacent to the outlet end of bore 13 and die head 15. Die head 15 has a central mandrel 16 located therein to shape the extrudate into an annular form. Located radially outwardly from the center of strainer plate 14 are two sets of bores 18 and 20 extending from the front face 22 through to the rear face 24. The opening of all of the bores 18 onto the front face 22 of plate 14 are equidistant from the center of strainer plate 14 and extend through the plate 14 in a clockwise direction. The opening of all of the bores 20 onto the front face 22 of plate 14 are equidistant from the center of strainer plate 14 but at a greater distance from the center of plate 14 than bores 18; and, in addition, the bores 20 extend through the plate 14 in a counterclockwise direction. Thus, as the extrudate flows through the strainer plate, bores 18 cause the extrudate to flow in a clockwise direction while the bores 20 cause the extrudate to flow in a counterclockwise direction which latter flow is at a greater radial distance from the center of the plate 14 so that the chopped filament particles passing through bores 18 are aligned helically in one direction while the chopped filament particles passing through bores 20 are aligned helically in a direction opposite to that of those passing through bore 18, to effect a crisscross pattern of the aligned particles. As seen in FIG. 7, a cross-sectional view of the resultant hose discloses the helical path of the chopped particles by the elliptical cross-sectional shape of the chopped aramid filaments. The number of bores 18 are identical in number to the bores 20, insuring that the same quantity of aligned fibers extruded via bore 18 is equal to the same quantity of aligned fibers extruded via bores 20 to provide a balanced flow with the oppositely disposed fibers reinforcing the hose to the same degree, thereby achieving maximum strength and flexibility. Such bores 18 and 20 extend in helical directions relative to the longitudinal center line of the plate member 14. The bores 18 and 20 extend through the plate member 14 at an angle that is 30 to 75 degrees relative to the longitudinal centerline of the plate member 14.

A modification of the disclosed invention is shown in FIG. 5 wherein strainer plate 30 has four sets of radially disposed bores. Bores 31 disposed along circular line A—A of strainer plate 30 extend from the front face 35 in a clockwise direction (as viewed in FIG. 5) through plate 30. Bores 32 disposed along circular line B—B of plate 30 extend from the front face 35 in a counterclockwise direction (as viewed in FIG. 5) through plate 30. Bores 33 disposed along circular line C—C of plate 30 extend from the front face 35 in a clockwise direction (as viewed in FIG. 5) through plate 30 while bores 34 along circular line D—D extend from the front face 35 in a counterwise direction (as viewed in FIG. 5) through plate 30.

The respective bores 31-32-33-34 are at progressive greater radial distances from the center of the strainer 30 with each succeeding adjacent pairs 31-32 and 33-34 having the same quantity of volumeric flow to maintain a balanced distribution and orientation of the chopped aramid fibers. The number of pairs of concentric bores may be increased; however, the quantity of flow of the oppositely disposed fibers are to be balanced. With the oppositely disposed pattern of bores 31 through 34, the chopped aramid fibers provide overlapping criss-crossing patterns of orientation of fibers to increase the burst strength and tensile strength of the hose.

Figure 8:
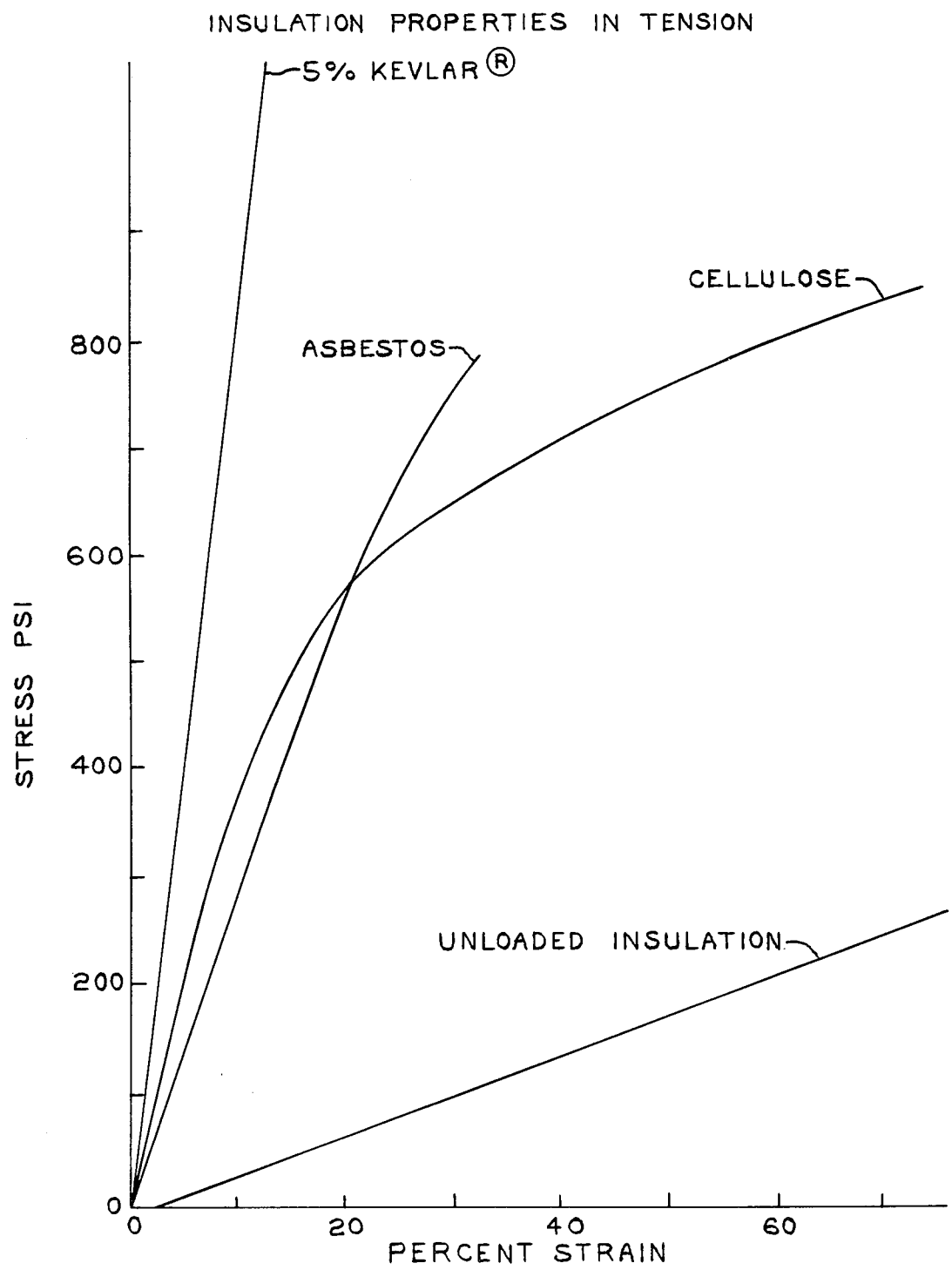
FIG. 8 is a stress-strain graph comparing an aramid fiber loaded hose compound with other fiber loaded compounds.

The unusual results of the chopped aramid fibers in the insulation layer of a hose is depicted in FIG. 8, wherein the stress vs percentage strain in depicted. A hose 40 depicted by FIG. 9 comprises an inner liner tube 41 formed of suitable elastomeric material such as rubber or organic plastic material formed as by extrusion. The tube 41 in the uncured condition is then covered by a first reinforcing braided layer 42 of cotton or fiber formed by helically windings, with such filler yarn consisting of cotton polyester or nylon. The first reinforcing layer 42 is then covered by an insulating or separating layer 45 of a rubber mixture containing chopped discrete aramid fibers that are orientated to provide additional strength in the finished product. A second reinforcing layer 46 is then braided over the insulating or separating layer 45, which layer 46 is formed of high tensile cord. A suitable protective covering layer 47 is applied over the reinforcing layer 46 and then vulcanizing the elastomeric materials so that the several layers are integrally united with the short aramid fibers reinforcing the entire structure to provide for an unusual increase in hose performance as depicted by FIG. 8 when compared to similar hose with asbestos, cellulose and unloaded insulation. The increase in performance characteristics is tremendous.

Figure 9:
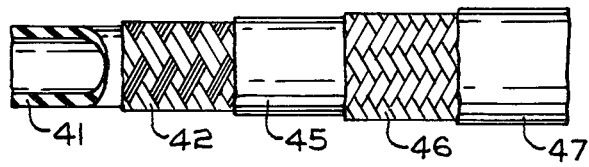
FIG. 9 is a side elevational view of a hose incorporating chopped aramid fibers in the insulating layer with the inner liner tube in section and the successive layers broken away at different locations to illustrate the internal construction.
Figure 10:
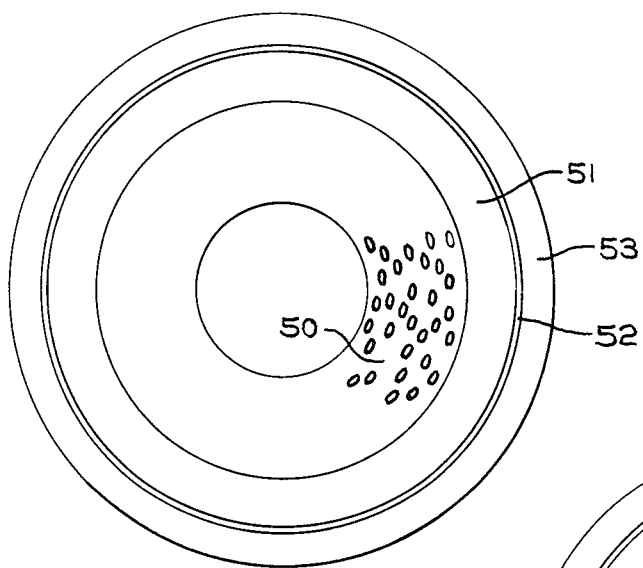
FIG. 10 is a front cross-sectional view of a hose construction.

FIG. 10 discloses a cross-section of a hose wherein conventionally the inner liner hose is separate and distinct from the first reinforcing layer as disclosed by FIG. 9; however, herein an extruder such as that depicted by FIG. 1 extrudes a rubber compound having chopped aramid fibers disbursed throughout the inner tube 50 thereby eliminating the need for the first reinforcing layer and its corresponding braiding deck. The next layer 51 is a reinforcing layer that is braided as depicted by element 46 in FIG. 9. An insulating or separating layer 52 of rubber surrounds the braided layer 51, which in turn is surrounded by a suitable protective covering layer 53. The hose is then vulcanized so that the several layers are integrally united with the chopped aramid fibers reinforcing the hose due to their balanced flow similar to a braid pattern. With this type of fiber loaded hose, a higher modulus is achieved in the compound. In addition, the hose described has the same or better performance characteristics than the similar hose that has the inner tube 50 replaced by an inner liner tube and a surrounding reinforcing braided layer of high tensile cord as described in FIG. 9.

Figure 11:
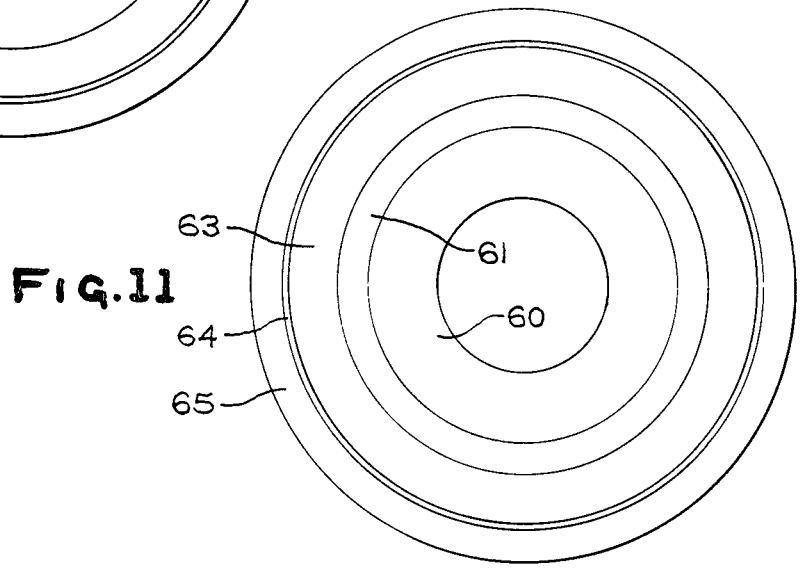
FIG. 11 is a modified form of a front cross-sectional view of a hose construction.

FIG. 11 depicts a cross-sectional hose having an inner liner tube 61 formed of suitable elastomeric material, such as rubber or organic plastic material formed as by extrusion. The tube 10, in the uncured condition, is then covered by a first reinforcing layer 61 formed by braiding a cotton yarn about the tube. A second reinforcing layer 63 of braided wire is then provided over the braided layer of cotton 61, which layer 63 is formed of high tensile metal wires. A suitable protective insulating layer 64 of rubber is then applied followed by a protective covering layer 65 of braided cotton as a reinforcing layer. This construction being referred to as a C-W-C (cotton, wire, cotton). As a modification of this design, the wire braided layer 63 is replaced by an aramid Kevlar ®, braided filament whose (C-K-C) performance as indicated by the table below exhibits equal to or better performance than the just described C-W-C hose.

| Test Results On 100R5-8 Hose Made From Twisted Aramid Fiber vs. Wire | | | | |
|---|---|---|---|---|
| | | Burst (psi) | Hose Stretch | Coupling Retention (Days) |
| Test #1 | C-K-C | 13,600 + | 0.8 | 1 |
| Test #2 | C-K-C | 12,500 + | 1.4 | 2 |
| Test #3 | C-K-C | 10,600 + | 3.0 | 2 |
| Test #4 | C-W-C | 13,000 | 1.0 | 1 |

+ The outer cotton and insulation broken, aramid filament did not break.

Various modifications are contemplated and may obviously be resorted to by those skilled in the art without departing from the described inventions, as hereinafter defined by the appended claims, as only preferred embodiments thereof have been disclosed.

I claim:

1. A strainer plate for an extruder for providing a balanced flow, said strainer plate comprising a plate member having a first set of apertures extending therethrough, said first set of apertures being located equidistant from the center of said plate member, said plate member having a second set of apertures extending therethrough, said second set of apertures being located equidistant from the center of said plate member but at a distance greater than said first set of apertures, said apertures of said first set extending through said plate member in a helical direction, and said apertures of said second set extending through said plate member in a helical direction opposite to said first set of apertures.

2. A strainer plate as set forth in claim 1 wherein said apertures extend through said plate members at an angle that is 30 to 75 degrees with respect to the longitudinal centerline of said plate member.

3. A strainer plate for an extruder as set forth in claim 2 wherein said first set and said second set of apertures are equal in number.

4. A strainer plate for an extruder having a plurality of sets of apertures lying in concentric circles, all of the apertures lying in any one said circle comprising a set of apertures, the center of said concentric circles being the longitudinal center line of said strainer plate, all of the apertures of any given set of apertures extending through said strainer plate in the same helical direction, all of the apertures of adjacent sets to said given set of apertures extending through said strainer plate in an opposite helical direction.

5. A strainer plate as set forth in claim 4 wherein said sets of apertures contain the same number of apertures to provide a balanced flow of extrudate through said plate.

6. A strainer plate for an extruder having a plurality of sets of apertures lying in spaced concentric circles, the center of said concentric circles being the longitudinal center line of said strainer plate, all of said apertures extending through said plate in a direction that is generally outwardly away from said center line, all of said apertures in each set are equidistant from said center, all of the apertures lying in alternate concentric circles extending through said strainer plate in the same helical direction, all of the remaining ones of said apertures extending through said strainer plate in a helical direction opposite to said apertures lying in said alternate concentric circles.

7. A strainer plate as set forth in claim 6 wherein said sets of apertures are paired in equal numbers in a direction from said center to the outer portion of said plate to provide a balanced flow of extrudate through said plate, and wherein all of the apertures of any given pair contain the same number of apertures.

* * * * *